United States Patent
Yang et al.

(10) Patent No.: US 7,645,564 B2
(45) Date of Patent: Jan. 12, 2010

(54) POLYMER SOLUTIONS, AQUEOUS DEVELOPABLE THICK FILM COMPOSITIONS, PROCESSES OF MAKING AND ELECTRODES FORMED THEREOF

(76) Inventors: Haixin Yang, 402 New Parkside Dr., Chapel Hill, NC (US) 27516; Pedro A. Jimenez, F-7 Gavioata St., URB. Tierralta 1, Guaynabo, PR (US) 00969; Cherng Y. Wang, 9 Tara Dr., Mount Laurel, NJ (US) 08054; Christopher John Roach, 1029 W. Sterlington Pl., Apex, NC (US) 27502; John Graeme Pepin, 1305 Bascomb Dr., Raleigh, NC (US) 27614-9013; Michael F. Barker, 10142 Mizner La., Raleigh, NC (US) 27616; Vincent Wen-Yuan Yeh, 2F, No. 226 Chuang Ching Road, Taipei (TW) 11049

( * ) Notice: Subject to any disclaimer, the term of this patent is extended or adjusted under 35 U.S.C. 154(b) by 546 days.

(21) Appl. No.: 11/367,558

(22) Filed: Mar. 3, 2006

(65) Prior Publication Data
US 2007/0208111 A1    Sep. 6, 2007

(51) Int. Cl.
*G03C 1/00*    (2006.01)
(52) U.S. Cl. ............... 430/281.1; 430/270.1; 430/288.1
(58) Field of Classification Search .................. 524/556
See application file for complete search history.

(56) References Cited

U.S. PATENT DOCUMENTS

| | | |
|---|---|---|
| 2,760,863 A | 8/1956 | Plambeck, Jr. |
| 2,850,445 A | 9/1958 | Oster |
| 2,875,047 A | 2/1959 | Oster |
| 2,927,022 A | 3/1960 | Martin et al. |
| 3,074,974 A | 1/1963 | Gebura |
| 3,097,096 A | 7/1963 | Oster |
| 3,097,097 A | 7/1963 | Oster et al. |
| 3,145,104 A | 8/1964 | Oster et al. |
| 3,380,831 A | 4/1968 | Cohen et al. |
| 3,427,161 A | 2/1969 | Laridon et al. |
| 3,479,185 A | 11/1969 | Chambers, Jr. et al. |
| 3,549,367 A | 12/1970 | Chang et al. |
| 3,583,931 A | 6/1971 | Bouchard |
| 4,912,019 A | 3/1990 | Nebe et al. |
| 4,925,771 A | 5/1990 | Nebe et al. |

(Continued)

OTHER PUBLICATIONS http://www.eastman.com/NR/rdonlyres/E7AB08D7-D82B-4DE3-A91F-3E74734E1EDB/0/M250.pdf.*
http://www.eastman.com/NR/rdonlyres/D3A109AF-6F7F-4D31-9955-B14DD9A6A5C1/0/M271.pdf.*

(Continued)

*Primary Examiner*—David Wu
*Assistant Examiner*—Vu Nguyen (57) ABSTRACT

The invention is directed to a process and more particularly, to utilizing polymer solutions to make thick film compositions. In one embodiment the process is directed to the formation of photoimageable thick film compositions for use in photo-patterning methods to make photoimageable electrodes in flat panel display applications, including plasma display panels (PDP). Polymer solutions are obtained by directly polymerizing desired monomers in a desired solvent to form a desired polymer, rather than by dissolving a pre-made polymer in a desired solvent. Other ingredients are added to the polymer solution to directly form thick film pastes, including photoimageable thick film pastes.

9 Claims, 1 Drawing Sheet

U.S. PATENT DOCUMENTS

| | | |
|---|---|---|
| 5,049,480 A | 9/1991 | Nebe et al. |
| 6,762,009 B2 * | 7/2004 | Glicksman et al. ....... 430/287.1 |
| 2002/0048730 A1 * | 4/2002 | Hatori et al. ................ 430/322 |
| 2004/0058184 A1 * | 3/2004 | Pepin ......................... 428/553 |

OTHER PUBLICATIONS http://www.dow.com/PublishedLiterature/dh_006c/0901b8038006cf20.pdf?filepath=oxysolvents/pdfs/noreg/327-00012.pdf&fromPage=GetDoc.*

* cited by examiner

FIG. 1

POLYMER SOLUTIONS, AQUEOUS DEVELOPABLE THICK FILM COMPOSITIONS, PROCESSES OF MAKING AND ELECTRODES FORMED THEREOF

FIELD OF THE INVENTION

The invention is directed to a process and more particularly, to utilizing polymer solutions to make thick film compositions. In one embodiment the process is directed to the formation of photoimageable thick film compositions for use in photo-patterning methods to make photoimageable electrodes in flat panel display applications, including plasma display panels (PDP). Polymer solutions are obtained by directly polymerizing desired monomers in a desired solvent to form a desired polymer, rather than by dissolving a pre-made dried polymer in a desired solvent. Other ingredients are added to the polymer solution to directly form thick film pastes, including, but not limited to, photoimageable thick film pastes.

BACKGROUND OF THE INVENTION

Since the market has been demanding ever cheaper and better quality flat panel displays, including PDPs, it has become necessary to develop new processes for each step of the manufacturing chain to enable the production of less expensive and better quality products. One technology utilized in PDP manufacturing has been thick film technology, including photoimageable thick films and photo-patterning thick film technologies. Photo-patterning technologies offer a means of making uniform finer lines and spaces compared to traditional screen-printing methods.

A photo-patterning method, such as Du Pont's FODEL® (E.I. du Pont de Nemours and Company) printing system, utilizes a photoimageable organic medium, as found in U.S. Pat. Nos. 4,912,019; 4,925,771; and 5,049,480, herein incorporated by reference, whereby the substrate is first completely covered (printed, sprayed, coated or laminated) with the photoimageable thick film composition and dried, if necessary. An image of the pattern is generated by exposure of the photoimageable thick film composition with actinic radiation through a photomask bearing a pattern. The exposed substrate is then developed. The unexposed portion of the pattern is washed away leaving the photoimaged thick film composition on the substrate that is then fired to remove organic materials and sinter inorganic materials and to adhere the pattern to the substrate. Such a technique has been widely used in the manufacture of plasma display panels.

The organic basis of typical thick film pastes is termed a medium. A medium consists of one or more polymers dissolved in a solvent. Such polymers impart a number of properties to the paste, including viscosity and dried toughness and strength. Other materials can be added at the medium stage, including, but not limited to, rheological additives, photoinitiators, and other materials.

The commonly used and existing process of making photoimageable thick film pastes is to dissolve a pre-made polymer in a solvent, add photoinitators and other organic additives to form a photoimageable organic medium. Then, the organic medium is mixed with functional particles, such as conductive, resistive or dielectric particles, glass frits and other additives. The polymer used to make the organic medium is separately pre-made by polymerization of monomers in a low boiling point solvent, such as 2-propanol or methylethylketone, followed by removing the solvent and drying to form a polymer powder. Next, for thick film applications, the polymer powder is re-dissolved in a high boiling point solvent commonly used for thick film pastes, such as Texanol® or terpineol. The process is time-consuming, involves multiple steps, and tends to introduce many variables including potential contamination which may lead to poor quality of the final photoimageable thick film pastes.

The present invention provides a manufacturing process for thick film pastes, including photoimageable thick film pastes, by providing a novel method of forming what is termed a polymer solution. This novel method of forming a polymer solution may be directly used in a new process to manufacture thick film pastes. Essentially, the present invention provides a new method for the formation of a thick film paste, wherein manufacturing steps are reduced because there is no need to pre-make and handle the dried polymer and re-dissolve the polymer to form an organic medium.

SUMMARY OF THE INVENTION

The invention is directed to a polymer solution and a method of forming a polymer solution for use in a thick film applications comprising: (a) providing ethylenically unsaturated monomers; (b) providing a high boiling point solvent with a boiling point in the range of 160° C. to 300° C.; (c) combining the monomers of (a) with the solvent of (b) to effect polymerization to form a polymer solution comprising a copolymer; and wherein said polymer solution has a viscosity of greater than 5 Pascal seconds at 25° C. at a shear rate of 4/s.

The present invention is further directed to a method of forming a thick film composition comprising the steps: (a) providing ethylenically unsaturated monomers; (b) providing a high boiling point organic solvent with a boiling point in the range of 160° C. to 300° C.; (c) combining the monomers of (a) with the solvent of (b) to effect polymerization to form a polymer solution comprising a copolymer wherein said polymer solution has a viscosity of greater than 5 Pascal seconds at 25° C.; (d) providing one or more functional powders; (e) providing one or more inorganic binders; (f) combining the polymer solution of (c) with functional powders of (d) and the inorganic binder of (e) to form a thick film composition. In one embodiment, the method of forming the thick film composition further comprises: providing a photohardenable monomer; providing a photoinitiation system; and wherein said photohardenable monomer and said photoinitiation system are combined in step (f) with the polymer solution of (c), the functional powders of (d) and the inorganic binder of (e) to form a photoimageable thick film composition.

DETAILED DESCRIPTION

The present invention provides a manufacturing process for thick film pastes, including photoimageable thick film pastes, by providing a novel method of forming a polymer solution. This novel method of forming a polymer solution may be directly used in a new process to manufacture thick film pastes. Essentially, the present invention provides a new method for the formation of a thick film paste wherein steps are reduced because there is no need to pre-make the polymer and re-dissolve the polymer to form an organic medium. The process of the present invention eliminates the step of forming a separate photoimageable organic medium. Other ingredients are directly added into the resultant polymer solution to form photoimageable thick film pastes. The present invention provides significant economic advantage over the existing prior art processes.

Furthermore, by directly forming the polymer in a solvent, the present invention avoids the dissolution and therefore, reduces the chance of polymer chain entanglements in a highly viscous polymer solution, which tend to cause rough line edges, pinholes, and other defects to products. The presently invented process of making the pastes improves the quality of the thick film pastes itself and results in an improved product.

A further advantage is that the components of the polymer solution, comprised of solvent and monomers, can be (although not required) filtered through very fine filters prior to polymerization. This allows essentially a pre-filtration step, which ensures cleanliness and low contamination of the resultant polymer solution since the finished, fully polymerized polymer solution is typically much higher in viscosity and therefore cannot be filtered through as fine filters as used for the starting, low viscosity, ingredients.

The viscosity of the polymer solution is at least 5 Pa·s at 25° C. at a shear rate of 4/s. In one embodiment of the present invention, the polymer solution has a high viscosity (i.e., greater than 100 Pa·s at 25° C. at a shear rate of 4/s). In a further embodiment, the viscosity of the polymer solution is in the range of 100 to 1,500 Pa·s at 25° C. at a shear rate of 4/s. In further embodiments, the viscosity of the polymer solution is in the range of 500 to 1500 Pa·s at 25° C. at a shear rate of 4/s and 800 to 1,200 Pa·s at 25° C. at a shear rate of 4/s.

The thick film manufacturing process of the present invention utilizes the polymer solution that resulted from direct polymerization of monomers in a solvent. The main purpose of the polymer solution is to serve as a viscous vehicle with suitable rheology for dispersion of the finely divided solids of the composition in such form that it can readily be applied to a ceramic or other substrate. Thus, the polymer solution must first be one in which the solids are dispersible with an adequate degree of dispersion stability. Secondly, the rheological properties of the polymer solution must be such that they lend good application properties to the dispersion. In one embodiment, the polymer solution is aqueous developable. This aqueous developability is especially useful for applications in which the polymer solution is used directly for the formation of a photoimageable thick film paste, such as those useful in flat panel display applications. In some embodiments, pH basic organic solvents may be used, for example, amines.

For some applications, the polymer solution has a viscosity of at least 5 Pa·s at 25° C. at a shear rate of 4/s to be able to sufficiently disperse conductive particles. In one embodiment the viscosity is greater than 100 Pa·s at a shear rate of 4/s. In a further embodiment, the viscosity is in the range of 100-500 Pa·s at a shear rate of 4/s. In one flat panel display application, the viscosity of the polymer solution is in the range of 500-1,200 Pa·s 25° C. at a shear rate of 4/s.

The polymer solution has an acid number of 20 mg KOH/g or greater, as measured in the polymer solution itself. In one embodiment, the acid number of the polymer solution is in the range of 20 mg KOH/g to 90 mg KOH/g, as measured in the polymer solution itself. In a further embodiment, the acid number of the polymer solution is in the range of 30 to 80 KOH/g, as measured in the polymer solution itself. In still a further embodiment, the acid number of the polymer solution is in the range of 50 to 70 KOH/g, as measured in the polymer solution itself.

Also, to obtain a good dispersion for thick film pastes, the solids content in the polymer solution is typically, above 10 weight percent, based on total polymer solution. In one embodiment, the solids content of the polymer solution is in the range of 10 to 60 weight percent, based on weight of total polymer solution. In a further embodiment, the solids content of the polymer solution is in the range of 30 to 60 weight percent, based on weight of total polymer solution. In still a further embodiment, the solids content of the polymer solution is in the range of 35 to 60 weight percent, based on weight of total polymer solution. However, it is noted that the solids content is influenced by the molecular weight and molecular structure of the polymer and may range accordingly.

The polymer solution(s) of the present invention are comprised of two key components: (1) solvent, and (2) polymer or polymers. These components are described in detail below.

I. Solvents

The solvent component of the polymer solution, which may be one solvent or a mixture of solvents, is ideally chosen so as to be suitable for polymerization reactions to obtain complete solution therein of the polymer and other organic components. The solvent should be inert (non-reactive) towards the other constituents of the composition. For screen printable and photoimageable pastes, the solvent(s) should have sufficiently high volatility to enable the solvent(s) to be evaporated from the dispersion by the application of relatively low levels of heat at atmospheric pressure. However, the solvent(s) should not be so volatile that the paste rapidly dries on the screen printing screen, at normal room temperatures and normal room humidity, during the printing process.

Additionally, the solvent(s) should be chosen so as not to interfere with or participate in the polymerization reaction. The preferred solvents for use in the process and paste compositions should have boiling points at atmospheric pressure of less than 300° C. and preferably less than 250° C. Typical solvent(s) used are high boiling point organic solvent(s) with boiling points in the range of 160° C. to 300° C. at atmospheric pressure. Such solvents include aliphatic alcohols, esters of such alcohols, for example, acetates and propionates; terpenes such as pine oils and alpha- or beta-terpineol, or mixtures thereof; ethylene glycol and esters thereof, such as ethylene glycol monobutyl ether and butyl cellosolve acetate; carbitol esters, such as butyl carbitol, butyl carbitol acetate and carbitol acetate and other appropriate solvents such as Texanol® (2,2,4-trimethyl-1,3-pentanediol monoisobutyrate) and mixtures thereof, as determined by the desired process and application requirements.

Solvent(s) may be filtered prior to polymerization to form a "clean" (i.e., substantially free from contaminants) polymer as they are typically, much lower viscosity than the finished polymer solution.

II. Polymers

Ethylenically unsaturated monomers are combined with the solvent(s) described in Section I. above, which upon polymerization form a polymer solution. In one embodiment, acrylic monomer(s) are useful. The polymer(s) formed from such polymerization of the ethylenically unsaturated monomers and solvents is described below. Polymers in the present invention are made of copolymer, interpolymer or mixtures thereof, wherein each copolymer or interpolymer comprises (1) a nonacidic comonomer comprising a $C_{1-10}$ alkyl acrylate, $C_{1-10}$ alkyl methacrylate, styrenes, substituted styrenes or combinations thereof and (2) an acidic comonomer comprising ethylenically unsaturated carboxylic acid containing moiety. A third or fourth or even more comonomers could also be present in polymer structures.

Monomers may be filtered before polymerization to give a clean polymer solution that may not need to be filtered.

The resultant copolymer, interpolymer or mixture thereof has an acid content of at least 10 weight percent of the total polymer weight; a glass transition temperature of 50-150° C. and an weight average molecular weight in the range of 2,000-150,000 and all ranges contained within.

The presence of acidic comonomer components in the polymer solution (i.e., after polymerization) are important to some embodiments of the present invention. The acidic functional group provides the ability to be developed in aqueous bases, such as aqueous solutions of 0.4-2.0% sodium carbonate. When acidic comonomers are present in concentrations of less than 10%, the composition is not washed off completely with an aqueous base. When the acidic comonomers are present at concentrations greater than 30%, the composition is less resistant under development conditions and partial development occurs in the imaged portions. Appropriate acidic comonomers include ethylenically unsaturated monocarboxylic acids such as acrylic acid, methacrylic acid, or crotonic acid and ethylenically unsaturated dicarboxylic acids such as fumaric acid, itaconic acid, citraconic acid, vinyl succinic acid, and maleic acid, as well as their hemiesters, and in some cases their anhydrides and their mixtures. Because they are cleaner burning in low-oxygen atmospheres, methacrylic polymers are preferred over acrylic polymers.

When the nonacidic comonomers are alkyl acrylates or alkyl methacrylates as mentioned above, it is preferable that these nonacidic comonomers constitute at least 50 weight percent, preferably 70-80 weight percent of the polymer binder. When the nonacidic comonomers are styrene or substituted styrenes, it is preferable that these nonacidic comonomers constitute 50 weight percent of the polymer binder and that the other 50 weight percent is an acid anhydride such as the hemiester of maleic anhydride. A favorable substituted styrene is alpha-methylstyrene.

The nonacidic portion of the polymer binder can contain up to about 50 weight percent of other nonacidic comonomers as substitutes for the alkyl acrylate, alkyl methacrylate, styrene, or substituted styrene portions of the polymer. Examples include acrylonitrile, vinyl acetate, and acrylamide. However, because it is more difficult for these to completely burn out, it is preferable that less than about 25 weight percent of such monomers in the total polymer binder is used.

The direct use of the polymer solution comprising single copolymers or combinations of copolymers as binders is recognized as long as each of these satisfies the various standards above. In addition to use of the above copolymers alone, addition of small amounts of other polymers is possible. Examples of these include, polyolefins such as polyethylene, polypropylene, polybutylene, polyisobutylene, and ethylene-propylene copolymers, polyvinyl alcohol polymers (PVA), polyvinyl pyrrolidone polymers (PVP), vinyl alcohol and vinyl pyrrolidone copolymers, as well as polyethers that are low alkylene oxide polymers, such as polyethylene oxide can be cited.

Furthermore, the weight average molecular weight of the polymer is in the range of 2,000-150,000 and any ranges contained therein.

The total polymer in the polymer solution is in the range of 5-70 weight percent and any ranges contained therein.

When the solvent and monomers used for making the polymer solution have been filtered, the resultant polymer solution is clean and can be used without being further filtered.

The resultant polymer solution could be mixed with photoinitiators to make a photoimageable organic medium, as described in U.S. Pat. Nos. 4,912,019; 4,925,771; and 5,049,480, herein incorporated by reference. The photoimageable organic medium may in turn be mixed with functional powders (conductive, resistive, dielectric) and inorganic binders to make photoimageable thick film pastes.

Additionally, in some embodiments, other additives may be added directly to the polymer solution. The additives include, but are not limited to, initiators, polymers, reactive solvents, UV absorbers, rheological modifiers, wetting agents, surfactants, and other additives known to those skilled in the art.

Figure 1:
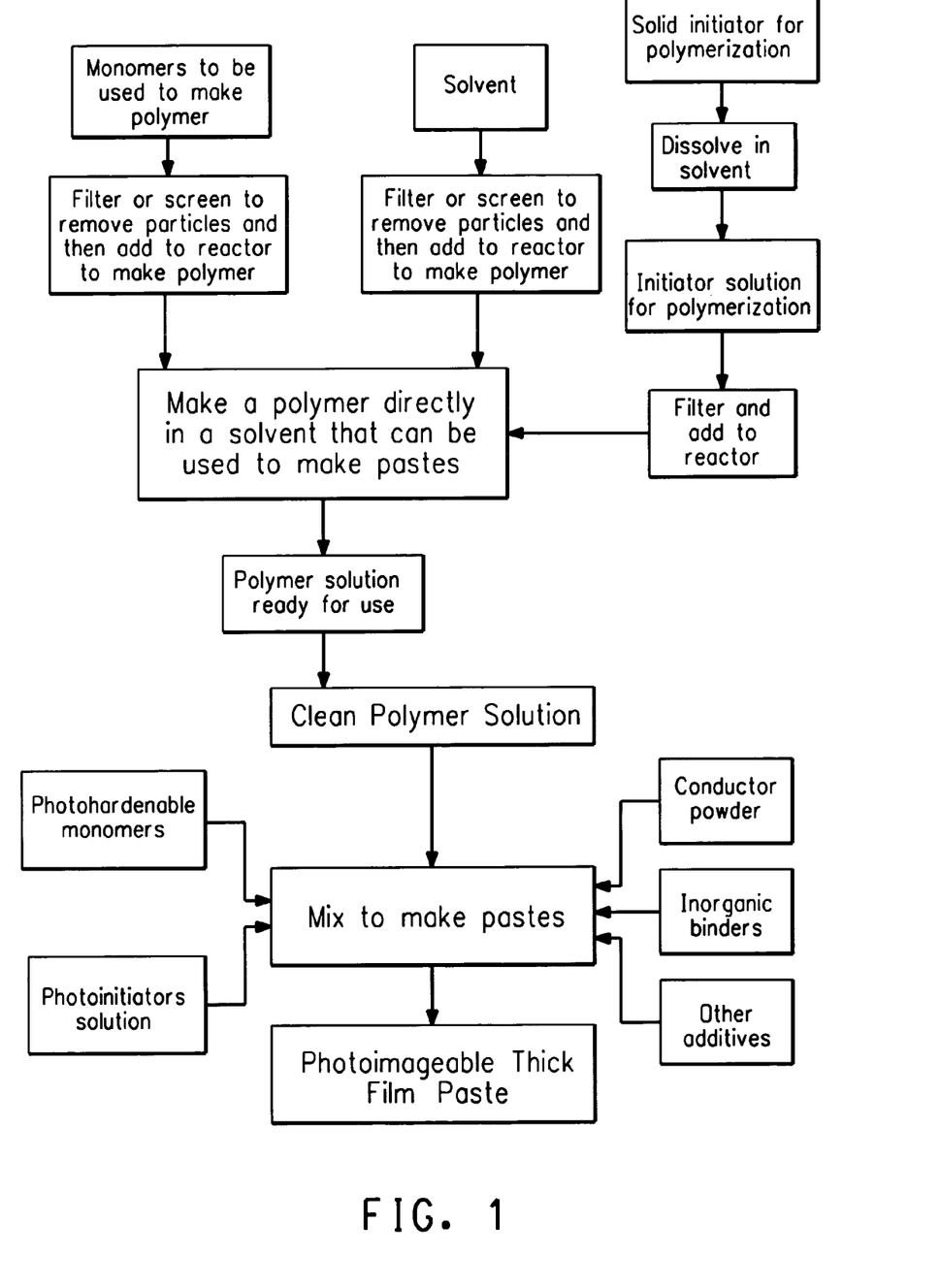
FIG. 1 describes the steps carried on in forming a photoimageable thick film paste composition by the method, as described above.

One embodiment of the present invention provides a more economical method of forming photoimageable thick film pastes by directly mixing photoinitiators or photoinitiator solutions which comprise the same solvent as the polymer solution, and other ingredients known by those skilled in the art which are used in photoimageable thick film paste(s), such as inorganic binders such as various inorganic oxides or glass frits and functional powders including, conductive powders like silver, gold, platinum, palladium, and mixtures thereof. The following scheme in FIG. 1 illustrates the invented process. This FIG. 1 is not intended to be limiting and other embodiments, as described in the specification, are included in the invented process.

Application of Polymer Solution in Thick Film Paste

The ingredients mixed with the polymer solution and resultant photoimageable thick film paste composition are discussed as follows. The general procedure is also described.

I. The Inorganic Materials

A. Functional Particles

Functional particles may include conductive, resistive, and dielectric particles. In one embodiment, conductive particles are used with other additives. In one embodiment, the conductive particles are selected from the group comprising Au, Ag, Pd, Pt, Cu, Ni, Al and mixtures thereof. The particles can be coated with organic materials, such stearic acid, etc. or coated with oxides, to promote dispersion and effect sintering behavior.

The conductive particles of the invention can also be $RuO_2$ and/or ruthenium based polynary oxides, as a conductive component. When ruthenium-based particles are utilized in the thick film composition, the composition is sometimes referred to as a "black" composition. In addition to the ruthenium-based conductive particles, the conductive particles may optionally comprise other metals such as precious metals including gold, silver, platinum, palladium, copper or combinations thereof. Ruthenium based polynary oxides are one type of pyrochlore oxide among many that is a multicomponent compound of $Ru^{+4}$, $Ir^{+4}$, or their mixture (M") represented by the following general formula:

$$(M_xBi_{2-x})(M'_yM''_{2-y})O_{7-z}$$

M is chosen from a group consisting of yttrium, thallium, indium, cadmium, lead, copper, and rare earth materials.

M' is chosen from a group consisting of platinum, titanium, chromium, rhodium, and antimony.

M" is ruthenium, iridium or their mixture.

x is 0-2 but $x \leq 1$ for univalent copper.

y is 0-0.5 but when M' is rhodium or is more than 1 of platinum, titanium, chromium, rhodium, or antimony, y is 0-1, and z is 0-1 but when M is bivalent lead or cadmium, this is at least equal to about x/2.

The ruthenium pyrochlore oxides are found in detail in U.S. Pat. No. 3,583,931, which is incorporated herein by reference.

Preferable ruthenium polynary oxides are bismuth ruthenate $Bi_2Ru_2O_7$, lead ruthenate $Pb_2Ru_2O_6$, $Pb_{1.5}Bi_{0.5}Ru_2O_{6.5}$, $PbBiRu_2O_{6.75}$ and $GdBiRu_2O_6$. These materials can easily be obtained in pure form; they are not adversely affected by glass binders and are stable even when heated to about 1000° C. in air.

In one embodiment, the ruthenium oxides and/or ruthenium pyrochlore oxides are used in proportions of 4-50 weight percent. In further embodiments, the compositional ranges of the ruthenium oxides and/or ruthenium pyrochlore oxides are 6-30 weight percent, 5-15 weight percent and 9-12 weight percent, based on the weight of the entire composition including the organic medium.

As noted above, electrically conductive metals may be optionally added to the black composition. Virtually any shape metal powder, including spherical particles and flakes (rods, cones, and plates) may be used in practicing the invention. The preferred metal powders are gold, silver, palladium, platinum, copper or combinations thereof. It is preferred that the particles be spherical. It has been found that the dispersion of the invention must contain no significant amount of solids having a particle size of less than 0.1 μm. When particles of this small size are present, it is difficult to adequately obtain complete burnout of the organic medium when the films or layers thereof are fired to remove the organic medium and to effect sintering of the inorganic binder and the metal solids. When the dispersions are used to make thick film pastes, which are usually applied by screen-printing, the maximum particle size must not exceed the thickness of the screen or the mesh opening of the screen. It is preferred that at least 80 percent by weight of the conductive solids fall within the 0.5-10 μm range.

In addition, it is preferred that the surface area to weight ratio of the conductive particles not exceed 20 $m^2/g$, preferably not exceed 10 $m^2/g$ and more preferably not exceed 5 $m^2/g$. When metal particles having a surface area to weight ratio of greater than 20 $m^2/g$ are used, the sintering characteristics of the accompanying inorganic binder are adversely affected. It is difficult to obtain adequate burnout and blisters due to premature sintering may appear. The particle morphology should be selected to optimize paste performance in the desired application.

Often, copper oxide is added to improve adhesion. The copper oxide should be present in the form of finely divided particles, preferably ranging in size from about 0.1 to 5 microns. When present as $Cu_2O$, the copper oxide comprises from about 0.1 to about 3 percent by weight of the total composition, and preferably from about 0.1 to 1.0 percent. Part or all of the $Cu_2O$ may be replaced by molar equivalents of CuO.

Resist and dielectric particles are typically selected from metal oxides.

B. Inorganic Binder

The electrically conductive powders described herein above are finely dispersed in an organic medium and are accompanied by inorganic binders and are optionally accompanied by metal oxides, ceramics, and fillers, such as other powders or solids. The function of an inorganic binder in a composition is binding the particles to one another and to the substrate after firing. Examples of inorganic binders include glass binders (termed frits), metal oxides and ceramics. Glass binders useful in the present composition are conventional in the art. Some examples include borosilicate and aluminosilicate glasses. Examples further include combinations of oxides, such as: $B_2O_3$, $SiO_2$, $Al_2O_3$, $P_2O_5$, CdO, CaO, BaO, ZnO, $SiO_2$, $Na_2O$, $Li_2O$, PbO, and $ZrO_2$ which may be used independently or in combination to form glass binders. Typical metal oxides useful in thick film compositions are conventional in the art and can be, for example, ZnO, MgO, CoO, NiO, FeO, MnO and mixtures thereof. In some embodiments, the glass composition is a Pb-free composition.

The glass frits most preferably used are the borosilicate frits, such as lead borosilicate frit, bismuth, cadmium, barium, calcium, or other alkaline earth borosilicate frits. The preparation of such glass frits is well known and consists, for example, in melting together the constituents of the glass in the form of the oxides of the constituents and pouring such molten composition into water to form the frit. The batch ingredients may, of course, be any compounds that will yield the desired oxides under the usual conditions of frit production. For example, boric oxide will be obtained from boric acid, silicon dioxide will be produced from flint, barium oxide will be produced from barium carbonate, etc. The presence of the volatilized components is to promote lower melting and mixing through the formation of gas bubbles, during the melting and homogenization of the glass batch. The glass is preferably milled in a ball mill with water to reduce the particle size of the frit and to obtain a frit of substantially uniform size. It is then settled in water to separate fines and the supernatant fluid containing the fines is removed. Other methods of classification may be used as well. Alternative milling can be done using jet-milling or'similar processing.

The glasses are prepared by conventional glassmaking techniques, by mixing the desired components in the desired proportions and heating the mixture to form a melt. As is well known in the art, heating is conducted to a peak temperature and for a time such that the melt becomes entirely liquid and homogeneous. The desired glass transition temperature is in the range of 325 to 600° C.

In one embodiment, at least 85 percent of the inorganic binder particles are in the range of 0.1-10 μm. The reason for this is that smaller particles having a high surface area tend to adsorb the organic materials and thus impede clean decomposition. On the other hand, larger size particles tend to have poorer sintering characteristics. It is preferred that the weight ratio of inorganic binder to total solids be in the range 0.1 to 0.75 and more preferably in the range 0.2 to 0.5.

II. Organic Materials

A. Photohardenable Monomer

Conventional photohardenable methacrylate monomers may optionally be used in the invention to form a photosensitive thick film composition. Depending on the application, it is not always necessary to include a photohardenable monomer in the composition of the invention.

Photohardenable monomer components are present in the thick film composition in amounts of 1-20 weight percent, based on the total weight of the dry photopolymerizable layer. Such preferred monomers include t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethyacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, herein incorporated by reference, 2,2-di(p-hydroxy-phenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di-(p-hydroxyphenyl)propane dimethacrylate, di-(3-methacryloxy-2-hydroxypropyl)ether of bisphenol-A, di-(2-methacryl-oxyethyl) ether of bisphenol-A, di-(3-acryloxy-2-hydroxypropyl)ether of bisphenol-A, di-(2-acryloxyethyl) ether of bisphenol-A, di-(3-methacrloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a weight average molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, herein incorporated by reference, e.g., those having a plurality of free radical polymerizable ethylenic linkages particularly when present as terminal linkages. Particularly preferred monomers are polyoxyethylated trimethylolpropane triacrylate, ethylated pentaerythritol triacrylate, dipentaerythritol monohydroxypentaacrylate and 1,10-decanediol dimethlacrylate.

B. Photoinitiation System

Suitable photoinitiation systems are those, which generate free radicals upon exposure to actinic light at ambient temperature. These include the substituted or unsubstituted polynuclear quinones which are compounds having two intracyclic carbon atoms in a conjugated carbocyclic ring system, e.g., 2-benzyl-2-(dimethylamino)-1-(4-morpholinophenyl)-1-butanone, 2,2-dimethoxy-2-phenylacetophenone, 9,10-anthraquinone, 2-methylanthraquinone, 2-ethylanthraquinone, 2-tert-butylanthraquinone, octamethylanthraquinone, 1,4-naphthoquinone, 9,10-phenanthrenequinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthracene-5,12-dione, and 1,2,3,4-tetrahydrobenz(a)anthracene-7,12-dione. Other photoinitiators which are also useful, even though some may be thermally active at temperatures as low as 85° C., are described in U.S. Pat. No. 2,760,863, herein incorporated by reference, and include vicinal ketaldonyl alcohols such as benzoin, pivaloin, acytoin ethers, e.g., benzoin methyl and ethyl ethers; α-hydrocarbon-substituted aromatic acyloins, including α-methylbenzoin, α-allylbenzoin and α-phenylbenzoin, thioxanthone and/or thioxanthone derivatives and the appropriate hydrogen donors. Photoreducible dyes and reducing agents disclosed in U.S. Pat. Nos. 2,850,445, 2,875, 047, 3,097,096, 3,074,974, 3,097,097, and 3,145,104, herein incorporated by reference, as well as dyes of the phenazine, oxazine, and quinone classes, Michler's ketone, benzophenone, 2,4,5-triphenylimidazolyl dimers with hydrogen donors including leuco dyes and mixtures thereof as described in U.S. Pat. Nos. 3,427,161, 3,479,185, and 3,549, 367, herein incorporated by reference, can be used as initiators. Also useful with photoinitiators and photoinhibitors are sensitizers disclosed in U.S. Pat. No. 4,162,162, herein incorporated by reference. The photoinitiator or photoinitiator system is present in 0.05 to 10 percent by weight, based on the total weight of a dry photopolymerizable layer.

C. Other Additives

Frequently, the photoimageable thick film pastes will also contain one or more plasticizers. Such plasticizers help to assure good lamination to substrates, provide toughness for mechanical handling, and enhance the developability of unexposed areas of the composition. The choice of plasticizers is determined primarily by the polymer that must be modified. Among the plasticizers that have been used in various binder systems are diethyl phthalate, dibutyl phthalate, butyl benzyl phthalate, dibenzyl phthalate, alkyl phosphates, polyalkylene glycols, glycerol, poly (ethylene oxides), hydroxy ethylated alkyl phenol, tricresyl phosphate triethyleneglycol diacetate and polyester plasticizers. Some materials in the composition may act as plasticizers without being added for that specific intent. Additional components known in the art may be present in the composition including, but not limited to, dispersants, stabilizers, releasing agents, dispersing agents, stripping agents, sintering controllers, rheological agents, crystallization promoters, UV absorbers, antifoaming agents and wetting agents. A general disclosure of suitable materials is presented in U.S. Pat. No. 5,049,480, herein incorporated by reference.

Polymer Preparation

The polymerization of the monomers by free radical polymerization mechanism is well known in the art of polymer chemistry.

General Paste Preparation

Typically, thick film compositions are formulated to have a paste-like consistency, and are called "pastes". Generally, the pastes are prepared under yellow light, typically, greater than or equal to 450 nm in wavelength, by mixing the polymer solution, monomer(s), inorganic materials and other organic components in a mixing vessel. The total composition is mixed until the inorganic particles are wetted by the organic materials. The mixture is then typically roll milled using a three-roll mill, although other dispersion processes suited to the composition can be used. The paste viscosity at this point could be adjusted with the appropriate vehicle or solvent to achieve a viscosity optimum for processing.

Care is taken to avoid contamination in the process of preparing paste compositions and in preparing parts, since contamination can lead to defects.

EXAMPLES

Printing Conditions

The paste was applied to glass substrates by screen-printing using 325 stainless steel mesh screen. The parts were dried at ~80° C. for approximately 20 minutes in an air atmosphere oven. The dried coating thickness was measured at 9-11 microns. Other application techniques can involve, but are not limited to, curtain coating, spraying, dipping, off-set printing, flexographic printing, doctor blading, and gravure.

Process Conditions

The parts were exposed through a phototool using a collimated UV light source. The energy level used was 400 mJ/sq. Other energy levels are possible. The exposed parts were developed using a conveyorized spray processor containing 0.5% by weight sodium carbonate in water as the developer solution. The developer solution temperature was maintained at ~30° C., and the developer solution was sprayed at 10-20 psi. The developed parts were dried by blowing off the excess water, after development, with a forced air stream.

General Firing Profile

The developed parts were fired in air using a 3-hour profile with peak temperature at 580° C. for 10 minutes.

Firing profiles are well within the knowledge of those skilled in the art of thick film technology. Removal of the dried organic medium and sintering of the inorganic materials is dependent on the firing profile. The profile will determine if the medium is substantially removed from the finished article and if the inorganic materials are substantially sintered in the finished article. The term "substantially," as used herein, means at least 95 percent removal of the medium and sintering the inorganic materials to a point to provide at least adequate resistivity or conductivity for the intended use or application.

Example I

Polymer Synthesis

Into a 1-gallon reactor equipped with a nitrogen gas inlet and mechanical stirrer, 450 grams of Texanol® or 2,2,4-trimethyl-1,3-pentanediol monoisobutyrate from Eastman Chemicals, were added and heated under nitrogen gas. A mixture of 996 grams 40 of methyl methacrylate (MMA) from ICI Chemicals, 249 grams of methacrylic acid from ICI Chemicals and 600 grams Texanol® was continuously added into the 1-gallon reactor at a constant speed over a period of 240 minutes, using pump#1. A mixture of 84 grams tert-butyl peroxyacetate from E.I. du Pont de Nemours and Company and 582 grams Texanol® was continuously added into the above 1-gallon reactor over a period of 275 minutes, using pump #2. The two pumps started at the same time. During the addition, the reaction mixture was stirred at 300 rpm at 135° C. under nitrogen gas. After the monomer feeding, the container for monomers was rinsed by 30 grams Texanol® and drained to the reactor. The reaction was held at 135° C. for 120 minutes. Then, a mixture of 8.16 grams of tert-butylperoxide from E.I. du Pont de Nemours and Company dissolved in 33 grams of Texanol® was added to the reactor. After 30 minutes, another mixture of 8.16 grams of tert-butylperoxide dissolved in 33 grams of Texanol® was added to the reactor. The container for initiator was rinsed by 19.5 grams Texanol® and drained to the reactor. The reaction was held with stirring at 135° C. for 150 minutes. The resultant polymer mixture was cooled to 100° C. and collected.

The resultant polymer solution contained 41.5 percent solid, had a viscosity of 620 Pa·s at 10 rpm on a Brookfield HBT Viscometer at a shear rate of 4/s, acid value of 51.5 mg KOH/g and MMA monomer residue of 0.03 percent. The weight average molecular weight of the polymer was 6,400 and the polydispersity 2.1.

Example II

Photoimageable Thick Film Paste Preparation

A mixture of 63.5 grams Texanol®, 6.54 grams PVP/PVA S-630, a copolymer of 60% vinylpyrrolidone and 40% vinyl acetate. K-value=30-50 from ISP Technologies, 10.89 grams Irgacure 651, 2,2-dimethoxy-2-phenylacetophenone from Ciba Specialty Chemicals, 9.70 grams SpeedCure DETX, 2,4-diethyl-9H-thioxanthen-9-one from Aceto Corporation, 9.07 grams Quantacure EPD, ethyl 4-dimethylaminobenzoate from First Chemical Corporation and 0.3 grams TABON, 1,4,4-trimethyl-2,3-diazabicyclo [3,2,2]-non-2-ene-N,N'-dioxide from E.I. du Pont de Nemours and Company was heated at 50° C. for 20 minutes with stirring to get a clean solution.

To a mixing jar, were added 4.74 grams above solution, 20.12 grams polymer solution resulted from Example I, 0.14 grams malonic acid from J. T. Baker Chemicals, 1.0 gram Texanol®, 3.81 grams SR-454, trimethylolpropane ethoxy triacrylate from Sartomer Corporation, 65.43 grams silver powder from E. I. du Pont de Nemours and Company and 4.76 grams glass powder with weight percentage composition of $Bi_2O_3$ (82), PbO (11), $B_2O_3$ (3.5), $SiO_2$ (3.5) from E. I. du Pont de Nemours and Company. The mixture was mixed until silver powders were wetted. The mixture was then roll-milled to give a paste. The paste had viscosity of 20.3 Pa·s at 25° C. at a shear rate of 4/s, measured at 10 rpm by a Brookfield RVT Viscometer.

Example III

Photoimageable Thick Film Paste Preparation

A mixture of 100 grams polymer solution resulted from Example I, 63.5 grams Texanol®, 6.54 grams PVP/PVA S-630, 10.89 grams Irgacure 651, 9.70 grams SpeedCure DETX, 9.07 grams Quantacure EPD, ethyl 4-dimethylaminobenzoate from First Chemical Corporation and 0.3 grams TABON, was heated at 50° C. for 30 minutes with stirring to get a clean solution.

To a mixing jar, were added 9.48 grams above solution, 15.38 grams polymer solution resulted from Example I, 0.14 grams Malonic acid, 1.0 gram Texanol®, 3.81 grams SR-454, 65.43 grams silver powder and 4.76 grams glass powder with weight percentage composition of $Bi_2O_3$ (82), PbO (11), $B_2O_3$ (3.5), $SiO_2$ (3.5). The mixture was mixed until silver powders were wetted. The mixture was then roll-milled to give a paste. The paste had viscosity of 20.1 Pa·s. at 25° C. at a shear rate of 4/s.

Example IV

To a mixing jar, were added 0.31 grams PVP/PVA S-630, 0.52 grams Irgacure 651, 0.46 grams SpeedCure DETX, 0.43 grams Quantacure EPD, 0.014 grams TABON, 20.12 grams polymer solution resulted from Example I, 0.14 grams Malonic acid, 4.14 gram Texanol®, 6.84 grams SR-454, 65.43 grams silver powder and 4.76 grams glass powder with weight percentage composition of $Bi_2O_3$ (82), PbO (11), $B_2O_3$ (3.5), $SiO_2$ (3.5). The mixture was mixed until silver powders were wetted. The mixture was then roll-milled to give a paste. The paste had viscosity of 19.8 Pas·s. at 25° C. at a shear rate of 4/s.

What is claimed is:

1. A method of forming a thick film composition comprising the steps:
    (a) providing ethylenically unsaturated monomers;
    (b) providing a high boiling point organic solvent with a boiling point in the range of 160° C. to 300° C.;
    (c) combining the monomers of (a) with the solvent of (b) to effect polymerization to directly form a copolymer in said solvent thereby forming a polymer solution comprising said copolymer wherein said polymer solution has a viscosity of greater than 5 Pascal seconds at 25° C.;
    (d) providing one or more functional powders;

(e) providing one or more inorganic binders;

(f) combining the polymer solution of (c) with functional powders of (d) and the inorganic binder of (e) to form a thick film composition.

2. The method of claim 1 further comprising:

providing a photohardenable monomer;

providing a photoinitiation system; and wherein said photohardenable monomer and said photoinitiation system are combined in step (f) with the polymer solution of (c), the functional powders of (d) and the inorganic binder of (e) to form a photoimageable thick film composition.

3. The method of claim 1, wherein said organic solvent comprising 2,2,4-trimethyl-1,3-pentanediol monoisobutyrate.

4. The method of claim 1, wherein said polymer solution has a solids content in the range of 10 to 60 percent, based on weight of total polymer solution.

5. The method of claim 1, wherein said polymer solution has an acid number in the range of 20 mg KOH/g to 90 mg KOH/g, as measured in said polymer solution.

6. The method of claim 1, wherein said polymer solution has a viscosity in the range of 100 to 1,500 Pascal seconds at 25° C. at a shear rate of 4/s.

7. The method of claim 6, wherein said polymer solution has a viscosity in the range of 500 to 1,500 Pascal seconds at 25° C. at a shear rate of 4/s.

8. A thick film composition formed by the method of any one of claims 1, 2 or 3-7.

9. A sheet comprising the composition of claim 8, wherein the composition has been dried to remove the organic solvent.

* * * * *

UNITED STATES PATENT AND TRADEMARK OFFICE
CERTIFICATE OF CORRECTION

PATENT NO. : 7,645,564 B2 Page 1 of 1
APPLICATION NO. : 11/367558
DATED : January 12, 2010
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Sixteenth Day of November, 2010

David J. Kappos
*Director of the United States Patent and Trademark Office*